United States Patent
Christopher

(10) Patent No.: US 6,270,350 B1
(45) Date of Patent: Aug. 7, 2001

(54) RECONFIGURABLE HARDWARE INTERFACE FOR VEHICLE DRIVING SIMULATORS USING A FIELD-PROGRAMMABLE GATE ARRAY

(75) Inventor: Charles A. Christopher, SLC, UT (US)

(73) Assignee: I-Sim Corporation, Salt Lake City, UT (US)

( * ) Notice: Subject to any disclaimer, the term of this patent is extended or adjusted under 35 U.S.C. 154(b) by 0 days.

(21) Appl. No.: 09/520,565

(22) Filed: Mar. 8, 2000

Related U.S. Application Data
(60) Provisional application No. 60/131,616, filed on Apr. 28, 1999.

(51) Int. Cl.[7] .................................................... G09B 9/05
(52) U.S. Cl. ................. 434/69; 434/62; 434/71; 463/6; 703/8
(58) Field of Search ................. 434/29, 60–65, 434/69–71, 307 R, 308, 365; 703/8, 13, 23; 463/6, 7, 35–40; 472/59–61, 130, 136; 702/42; 700/30, 85; 701/54; 379/93.08; 345/145, 167, 475, 509; 348/113, 116; 273/148 B, 442

(56) References Cited

U.S. PATENT DOCUMENTS

| | | | |
|---|---|---|---|
| 4,750,888 | * 6/1988 | Allard et al. | 434/69 |
| 4,760,388 | * 7/1988 | Tatsumi et al. | 345/1 |
| 4,817,948 | * 4/1989 | Simonelli | 463/6 |
| 4,949,119 | * 8/1990 | Moncrief et al. | 395/500.29 |
| 5,277,584 | * 1/1994 | DeGroat et al. | 434/29 |
| 5,438,614 | * 8/1995 | Rozman et al. | 379/93.08 |
| 5,660,547 | * 8/1997 | Copperman | 434/29 |
| 5,707,237 | * 1/1998 | Takemoto et al. | 434/69 |
| 5,921,780 | * 7/1999 | Myers | 434/69 |
| 6,009,256 | * 12/1999 | Tseng et al. | 395/500.34 |

FOREIGN PATENT DOCUMENTS

4102176A1 * 8/1991 (DE).
2607613A1 613 * 6/1988 (FR).

* cited by examiner

Primary Examiner—Joe H. Cheng
(74) Attorney, Agent, or Firm—Daniel McCarthy

(57) ABSTRACT

A reconfigurable hardware interface for driving simulators that uses a field programmable gate array for interfacing with driving controls and instruments. The field programmable gate array is interposed between the input/output of the computer system of the driving simulator and the vehicle cab of the driving simulator. This provides convenience in quickly adapting a driving simulator to a particular type of cab and controls, as well as other functions.

50 Claims, 5 Drawing Sheets

RECONFIGURABLE HARDWARE INTERFACE FOR VEHICLE DRIVING SIMULATORS USING A FIELD-PROGRAMMABLE GATE ARRAY

Priority is claimed to Ser. No. 60/131,616 files on Apr. 28, 1999.

FIELD OF THE INVENTION

This invention relates to vehicle simulators and, more particularly, to methods and devices for interfacing vehicle controls, instruments and electronics, as well as related systems, such as a motion base, to vehicle simulation software.

BACKGROUND OF THE INVENTION

Vehicle driving simulators, which provide a highly-realistic driving experience, are becoming increasingly affordable. Sophisticated simulators generally employ a simulator master control program which is loaded and run on a host computer system. Slaved to the host computer system is a graphics imaging engine, which generates real-time graphic images in response to control inputs from the host computer system. These images may be projected on a screen which may provide a viewing angle within a range of about 90 degrees to a full 360 degrees in order to create a virtual reality which provides a highly-realistic driving experience. In order to make the simulation as realistic as possible, a simulator may utilize the vehicle cab of an actual production vehicle. Control inputs made by the driver as he manipulates the controls of the vehicle cab are interfaced with the master control program. The perception of reality may be further enhanced with a sound system that produces high-fidelity sounds and a motion system coupled to the cab which subjects the driver to forces, all consistent with the projected images of the outside environment, the road surface, and driver inputs. A high-end driving simulator may even generate tire noise appropriate for the imaged road surface. Purchasers of vehicle driving simulators generally have one or more specific applications for the simulator. For example, it may be used to train semi-truck drivers, it may be used to teach high-speed pursuit skills to police officers, or it may be used to improve the safety skills of emergency vehicle drivers. In order to enhance the assimilation of driving skills for such specialized uses, it is highly desirable to use the vehicle cab of the actual vehicles which will be driven on the job. This complicates the manufacture of the simulators, as there are literally dozens of possible vehicle cabs which must be interfaced to the simulator software. For example, one police department may wish to use a Ford Crown Victoria cab for its simulator, while another may desire to use a Chevrolet Lumina cab. The situation is further complicated by the fact that governmental agencies, such as police departments, typically change vehicles every two to three years. In addition, truck driving schools may wish to utilize several truck cabs to improve the transferability of learned skills to the real world.

The vehicle driving simulation industry, though in its infancy, is highly competitive. A simulator manufacturer can improve profitability by keeping hardware inventories to a bare minimum and by meeting the needs of the greatest number of customers with the fewest number of separate product lines. Ideally, a single basic product line would be easily customizable to meet the needs of all customers.

Software changes can implement many of the differences in simulating different types of vehicles, but at some point the software must connect to each cab's unique electrical circuitry through a hardware interface. Some of the differences between individual cab's electrical instrumentation may include:

1. Voltage ratings;
2. Input signal waveform requirements;
3. Switch logic, such as seat belt switches being open or closed when fastened.
4. Number of input and output signals; and
5. Types of sensors on the steering wheel, brake pedal, accelerator pedal, or gear shift lever. (i.e. resistive potentiometers, optical encoders, switches, etc.)

The current art addresses these differences in a variety of ways. FIGS. 1 through 3 represent three approaches now used to interface a vehicle cab to a simulator system having a display screen 101, a projector 102 for projecting images on the screen 101, and a simulator data processing unit 103. The first interface approach is represented by FIG. 1. Using this approach, the cab 105 is completely rewired for connection to a standard interface unit 104. The primary advantage of this approach is there are no software changes from one cab to another. The major disadvantage, though, is that the rewiring process is costly and time-consuming. This is particularly true if the job requires the customization of switches and instrumentation.

The second approach, represented by FIG. 2, is to design unique interface circuitry 204 for each cab 205 which interconnects the standard cab wiring with the simulator data processing unit 103. The main advantages of this option are that no changes need be made to either the simulation software or to the cab wiring. There are several significant disadvantages to this approach, however. Much time will be spent not only in the analysis and documentation of the cab circuitry, but in the design and manufacture of the custom interface circuitry. Additionally, as the custom interface circuitry will be built in limited quantities, the manufacturing costs will be relatively high. A further disadvantage is the need to reanalyze and document cab circuitry and redesign and manufacture new interface circuitry each time a different vehicle cab is introduced.

Another approach frequently used in the simulation industry is represented by FIG. 3. An interface 304 is designed using existing off-the-shelf circuit boards and electronic modules. Such an approach typically requires that changes be made to the simulation software. The primary advantage to this approach is that less custom hardware is required. By using readily-available boards and modules, not only are design and manufacturing costs are reduced, but maintenance costs as well. There are many problems with this approach. The off-the-shelf circuit boards are typically expensive and difficult to integrate into the system. They may also be difficult to program. In addition, if the software is redesigned, the boards must generally be replaced. Also significant are the time and costs associated with reverse engineering (i.e., analyzing and documenting) the cab circuitry. If software changes are required, this will add to the cost. This option may not even be available for some cabs, for they are so unique that they require custom-designed interface hardware.

None of the interface options heretofore described lends itself to the rapid and economical interfacing of a cab to a simulator system. Simulator customers want to be able to change cabs periodically and want to minimize down time and costs related to those changes. Although the interface option of FIG. 1 permits rapid swapping of cabs and minimal costs related to the actual swap, the cost of providing the standard interface at the cab is substantial.

What is needed is an interface which will reduce the cost of connecting a vehicle cab to a driving simulator, and which will permit a simulator owner to swap cabs on his simulator much more quickly, much less expensively, and with far fewer software changes than would be possible using current cab interfaces. Such an interface will facilitate the swapping of vehicle cabs by requiring only simple electrical disconnections and connections and minor software modifications. In addition, it would be helpful if debugging of the new simulator hardware-cab combination were facilitated by the new interface.

SUMMARY OF THE INVENTION

For the purposes of this invention, a driving simulator system includes a vehicle cab in which the simulator driver sits. The system also includes a visual display screen on which is displayed graphic images representative of a real-time driving environment. The system also includes at least one host data processing, or computer, system having one or more input/output ports. Other data processing elements may be slaved to the host computer. A graphics imaging engine, such as a Lockheed Martin Real 3-D Pro, which generates real-time graphic images for display on the screen in response to control inputs from the host computer system, is one such element. A digital signal processor, which may be used to synchronize the real-time operation of the various system components, is another such element. The driving simulator system also includes a driving simulation software program executable by the host computer. The software program is designed to recognize a set of input signals which correspond to operator-initiated control inputs emanating from the vehicle cab. The software program also generates a set of output signals. Some of these output signals are used to control various other system components; others are sent to the vehicle cab where they are used to control cab instrumentation.

The focus of this invention is the interposition of a field-programmable integrated circuit known as a field-programmable gate array, or FPGA, between the input/output port and the electrical circuitry of the vehicle cab. The programmable integrated circuit is responsible for converting electrical signals from the cab to input signals understood by the computer and loaded software, and also converting program output signals to a set of electrical inputs utilizable by the cab. Although much of the funtionality of such an FPGA interface might be provided by a microprocessor or microcontroller, there are certain functions which only an FPGA can provide. For example, decoding of optical encoder output can be provided by circuitry internal to the FPGA. In addition, signal conditioning circuitry may also be provided by FPGA circuitry. For example, each switch input may be provided with a schmitt trigger which improves signal reliability by eliminating signal bounce which may occur when a switch is closed.

For a preferred implementation of the invention, it may be desirable to protect the FPGA against electrostatic discharges, higher-than-expected voltages caused by inductive load kickbacks or miswiring, ground-loop problems, or shorts caused by defective wiring by placing isolation circuitry between it and the vehicle cab.

For a preferred first embodiment of the invention, the FPGA is of the RAM-configurable type. That is, the FPGA includes on-board volatile memory registers in which may be stored a unique set of data values which configure the FPGA. This configuration data may be stored on a non-volatile medium, such as a hard disk drive, and loaded into the FPGA during system initialization. Multiple sets of configuration data, each for a different vehicle cab may be stored within a data file library on the hard disk drive of the host computer system. Thus, a new vehicle cab may be interfaced to the driving simulator by selecting the appropriate data file for the new cab from the library. It should be understood that other FPGA types, such as those which utilize antifuse technology, may also be used to implement the invention. However, there are definite advantages to using a reprogrammable FPGA. Debugging is much easier, as the chip does not have to be replaced when the configuration data file is modified or updated. Furthermore, different vehicle cabs can be accommodated by a single reprogrammable FPGA.

For an alternative second embodiment of the invention, the FPGA and related interface circuitry reside on a single circuit board. The FPGA and any special components required for a particular cab interface are packaged as a single module which plugs into a socket on the circuit board. Such special components may include, without limitation, optical encoders and ADC/DAC waveform/level generators and interpreters. In order to switch vehicle cabs, the module is replaced as a unit.

For either embodiment, control signals from the host computer system are sent through the FPGA to the gages in the cab. Likewise, signals from cab controls and switches are routed through the FPGA in the opposite direction to the host computer system.

In order to interface a completely new cab to the simulator, each input or output at the cab must only be identified and connected to a specific pin on an interface bus that is coupled to the cab side of the FPGA. The FPGA can then be programmed so that each input/output from the cab is correctly matched with a corresponding input/output from the host computer system. By subsequently testing each cab function during a data file edit operation, proper logic values may be readily assigned to any given signal. For example, if the simulation software expects a high logic value for a latched seat belt, but the cab input for this feature delivers a low logic level instead, the FPGA can be reprogrammed during the edit function to invert the received signal. In addition to providing proper routing and proper logic assignments for individual signals, the FPGA may also be programmed to provide signal processing functions for any signal. For example, the FPGA may be programmed to provide position sensing for a particular input when that input is coupled to an optical encoder in the cab.

One obvious advantage of using a reconfigurable FPGA is that the process for interfacing a new cab to the simulator system is greatly simplified. In addition, because the FPGA is reconfigurable, the data file which configures the FPGA can be tested and edited quickly and safely. As a result of these factors, interfacing costs are greatly reduced in comparison with existing interfacing methods.

Another advantage of using a reconfigurable FPGA is that it creates a consistent interface for the simulation software regardless of the cab's electrical configuration. Input signals which come into the FPGA from the cab, as well as output signals from the host computer system, are routed and processed by the FPGA as dictated by the data file values which have been loaded into the volatile memory of the FPGA. As the simulator software can always expect certain standard signals from the FPGA, modifications to the simulation software are minimized, or eliminated altogether, when the vehicle cab is changed. The FPGA configuration makes the cab transparent to the simulation software.

DETAILED DISCLOSURE OF THE INVENTION

A vehicle driving simulator may be configured in many different ways. The final configuration will be dictated by cost and availability of subcomponents, the need for simplicity and serviceability, the degree of realism desired, and, to some extent, by random design choice where no apparent advantage exists among certain configurations. It should be understood that compromises are required for the design and assembly of any commercial product. Consequently, the preferred embodiment for a vehicle driving simulator, which incorporates the present invention, will change as new components become available and existing components become more affordable.

Figure 1:
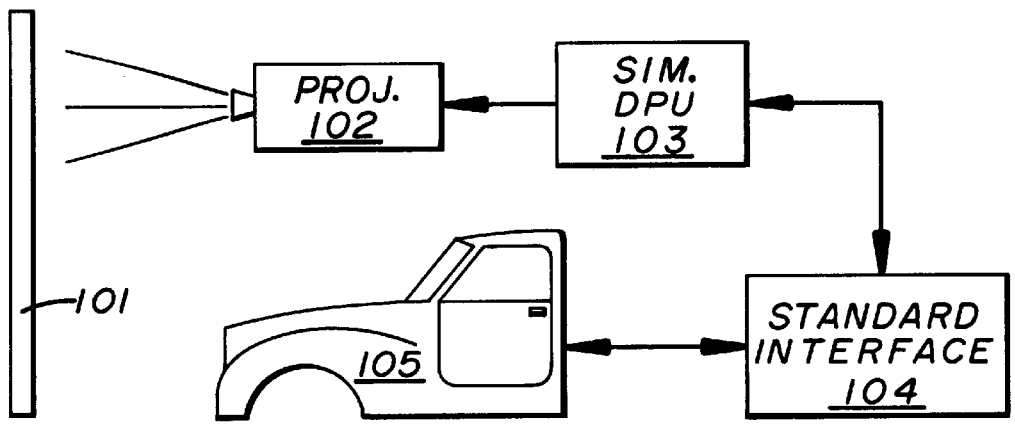
FIG. 1 is a block diagram which depicts a first prior art method of interfacing a vehicle cab to a computer on which is run a vehicle simulation program.
Figure 2:
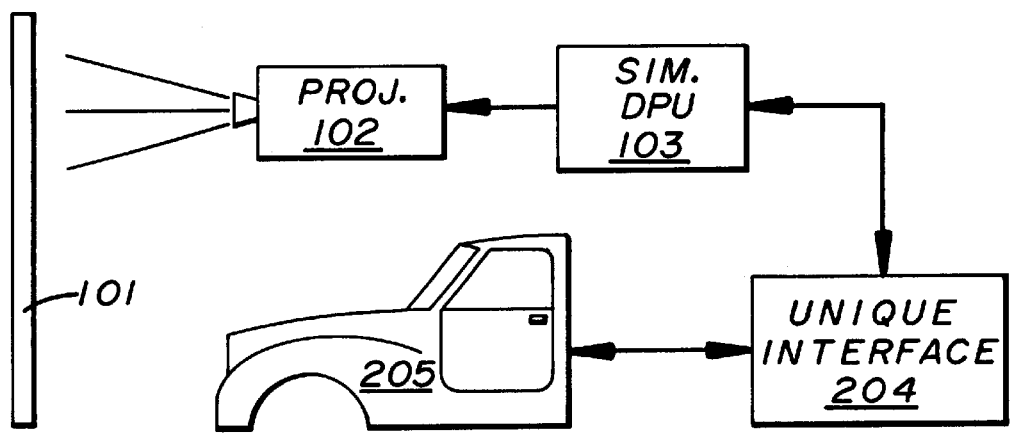
FIG. 2 is a block diagram which depicts a second prior art method of interfacing a vehicle cab to a computer on which is run a vehicle simulation program.
Figure 3:
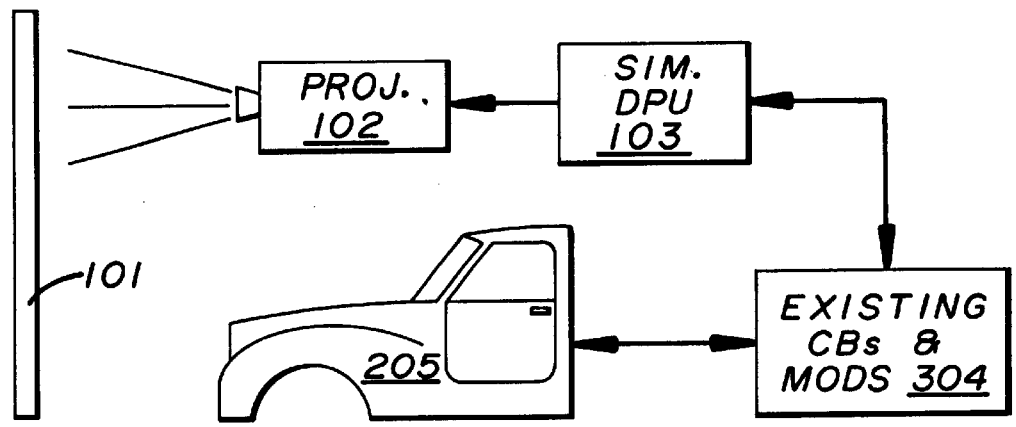
FIG. 3 is a block diagram which depicts a third prior art method of interfacing a vehicle cab to a computer on which is run a vehicle simulation program.
Figure 4:
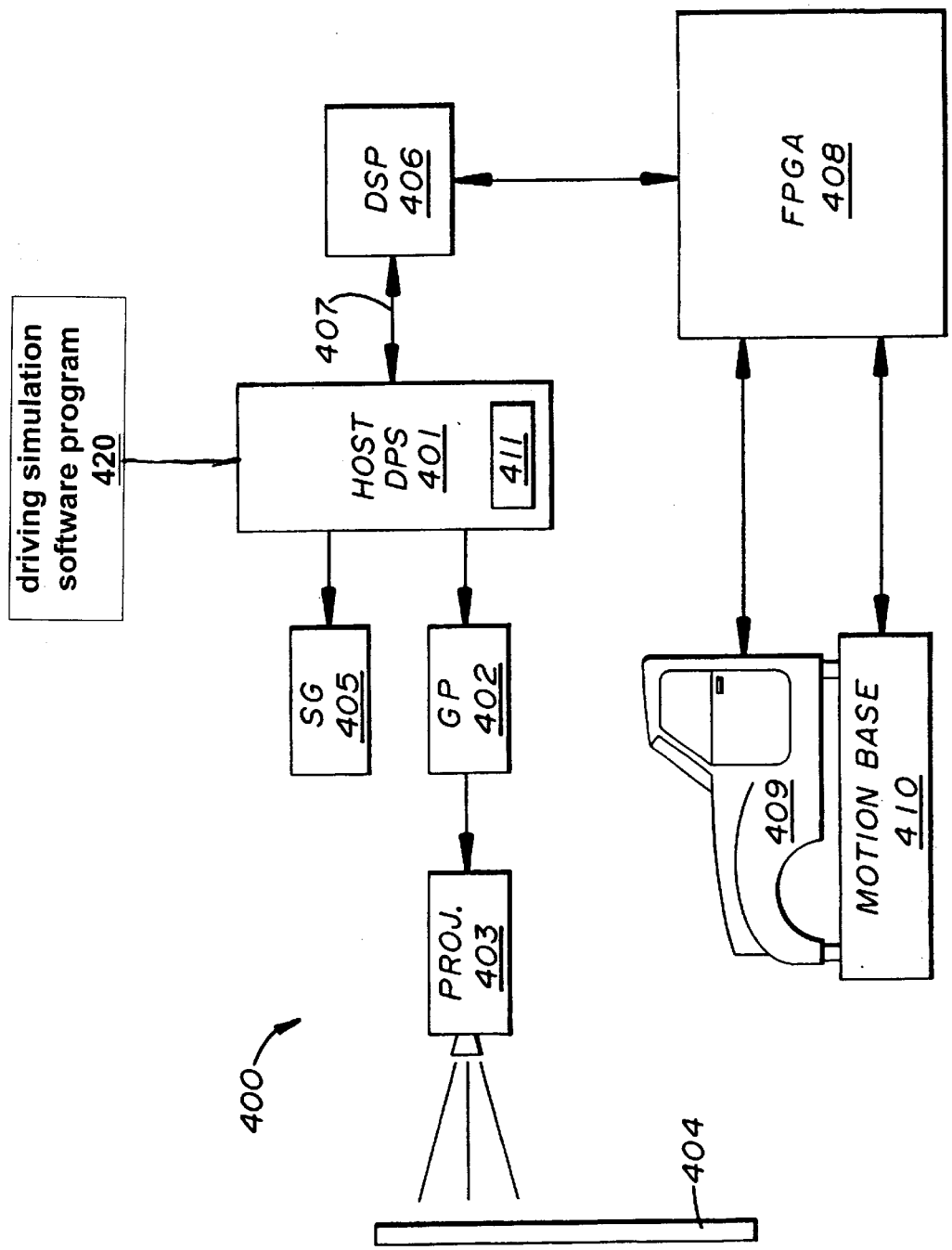
FIG. 4 is a block diagram of a preferred embodiment of the invention for interfacing a simulator software interface with vehicle cab electronics.

Referring now to FIG. 4, the currently preferred embodiment of the vehicle driving simulator system 400 includes a host computer, or data processing system 401 which may be running a driving simulation software program. The computer system 401 is coupled to a graphics processor 402, such as a Lockheed Martin Real 3-D Pro, which generates real-time graphic images for display by projector 403 on a screen 404 in response to control inputs from the host computer system 401.

The host computer is also coupled to a sound generator 405. As a compromise made in the quest for lower total system costs, the host computer system 401 runs under a Microsoft® Windows® operating system, in spite of the fact that this operating system is not optimized for deterministic processing. Consequently, the host system 401 is slaved to a digital signal processor (DSP) 406 via a parallel interface 407, such as an ISA or PCI bus. A serial bus, could of course, be used in place of the parallel bus. The DSP 406 provides a master clock signal for the various components of the simulator system 400, thereby orchestrating the operation of the various system components so that realistic system synchronicity is achieved. The DSP 406 is coupled directly to a field programmable gate array (FPGA) 408, also via a serial interface. A Xilinx® XC5215 integrated circuit (IC) is the currently preferred FPGA. The XC5215 IC is a RAM-configurable device having on-board volatile memory registers in which may be stored cab-specific configuration data. The FPGA 408 is configured by this unique set of data values. The cab configuration data may be stored on a non-volatile medium, such as a hard disk drive 411, and loaded into the FPGA 408 during system initialization. Multiple sets of configuration data, each for a different vehicle cab may be stored within a data file library on the hard disk drive of the host computer system. Thus, a new vehicle cab may be interfaced to the driving simulator by selecting the appropriate data file for the new cab from the library.

Figure 5:
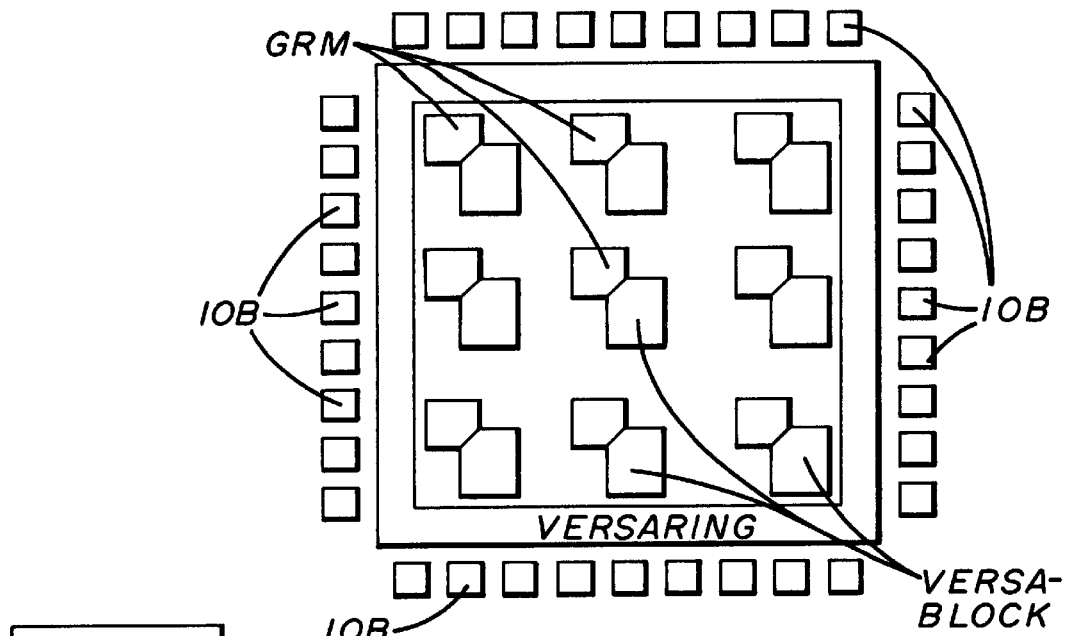
FIG. 5 is an architectural block diagram of the Xilinx® XC5200 family of FPGAS.
Figure 6:
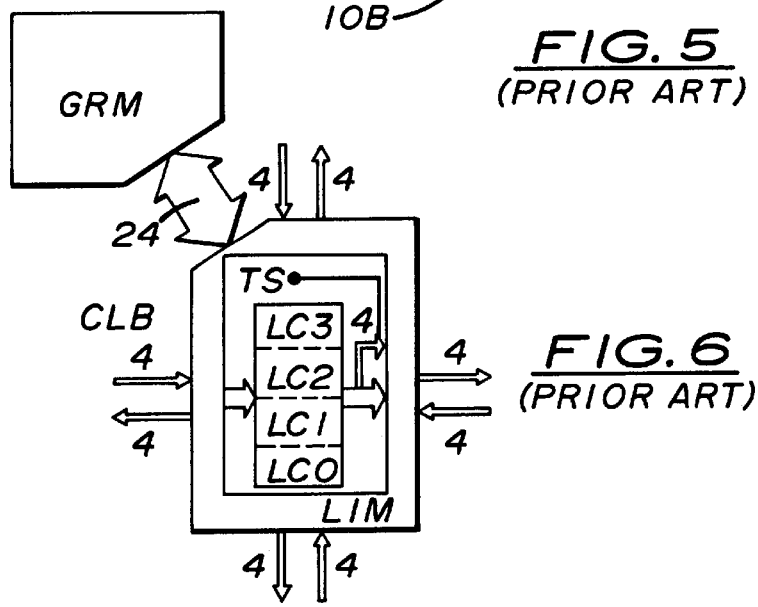
FIG. 6 is a block diagram of the Versa Block of the XC5200 FPGA family.
Figure 7:
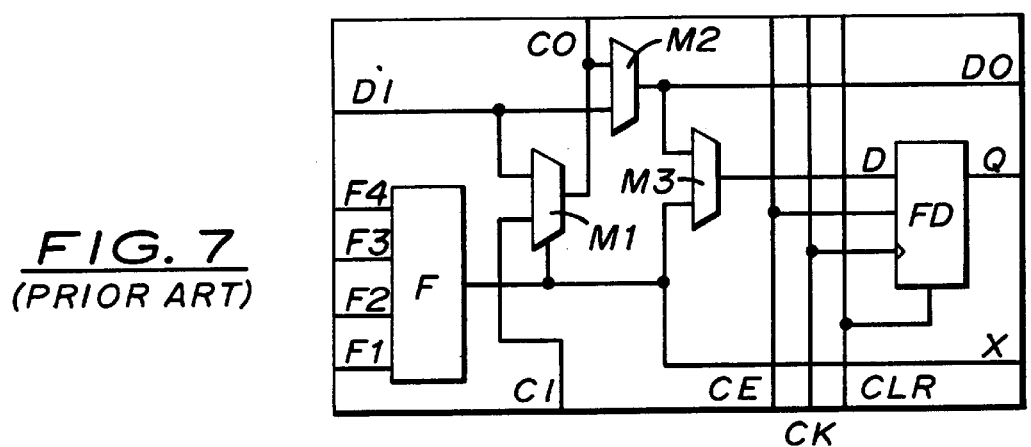
FIG. 7 is a logic diagram of a logic cell of the XC5200 FPGA family.

The architecture of the XC5215 IC is similar to that of conventional FPGAS, in that it has programmable input/output blocks, programmable logic blocks and programmable interconnect. FIGS. 5, 6 and 7 provide a brief overview of the architecture of the XC5200 family of FPGAS. FIG. 5 presents a conceptual overview of XC5200 architecture. Unlike conventional FPGAS, the logic and local routing resources are combined in flexible VersaBlocks. General purpose routing connects to each VersaBlock through a General Routing Matrix (GRM). A VersaRing is a "freeway" of interconnect cell surrounding the device which provides connections from multiple Input/Output blocks (IOBS) to the internal logic made up of the VersaBlocks. The architecture of a single VersaBlock is depicted in FIG. 6. A Configurable Logic Block (CLB) contains four logic cells, LCO, LCI, LC2 and LC3. The CLB is coupled to a programmable Local Interconnect Matrix (LIM), which in turn is coupled to four adjacent VersaBlocks via a quartet of four-bit Direct Connects and to the GRM via 24 bidirectional nodes. The architecture of a single logic cell (LC) is shown in FIG. 7. Each LC contains: a function generator F having four inputs FI, F2 F3 and F4; a storage device (FD) configurable as a D flip-flop or as a latch; and control logic. The signals identified in FIG. 7 are as follows: DI=data in; DO=data out; CI=carry in; CO=carry out; CE=ciock enable; CK=clock; CL=clear; D=latch data in; Q=latched output; and X=uniatched output. The control logic utilizes a trio of multiplexers MI, M2 and M3 which provide carry logic for fast implementation of arithmetic functions. The control logic can also be configured as a cascade chain allowing decode of very wide input functions. Thus, there are five inputs to the cell (FI, F2, F3, F4, DI and CI) and four outputs (CO, DO, Q, and X). The independence of the inputs and outputs allows the software to maximize the resource utilization within each LC. The signals CE, CK, and CL, which are common to all cells within a VersaBlock, are used to write and clear the value stored within latch FD. Each LC also contains a direct feedthrough path that does not sacrifice the use of either the function generator or the register.

Use of the XC5215 IC is advantageous because of its low cost, and because it can be reprogrammed merely by writing new data to the on-board memory registers. Other types of FPGAS, such as those which employ antifuse technology, may be also be used to practice the present invention. However, an FPGA which utilizes antifuses for internal programming may be programmed only once. In order to correct an incorrectly programmed FPGA of that type, a new, unprogrammed FPGA must be used. The Xilinx IC, on the other hand, may be reprogrammed repeatedly, both to correct errors and to accommodate a new cab requiring different data register values. Although a parallel interface, such as an ISA or PCI bus is employed to interconnect the host computer 401 and the DSP 406, a serial interface might be used in its place. Likewise, although a serial interface is used to couple the the DSP 406 and the FPGA 408, a parallel interface might be used in its place. The FPGA 408 is, in turn, coupled to the vehicle cab 409 and to a motion base 410 on which the vehicle cab 409 is mounted.

Figure 8:
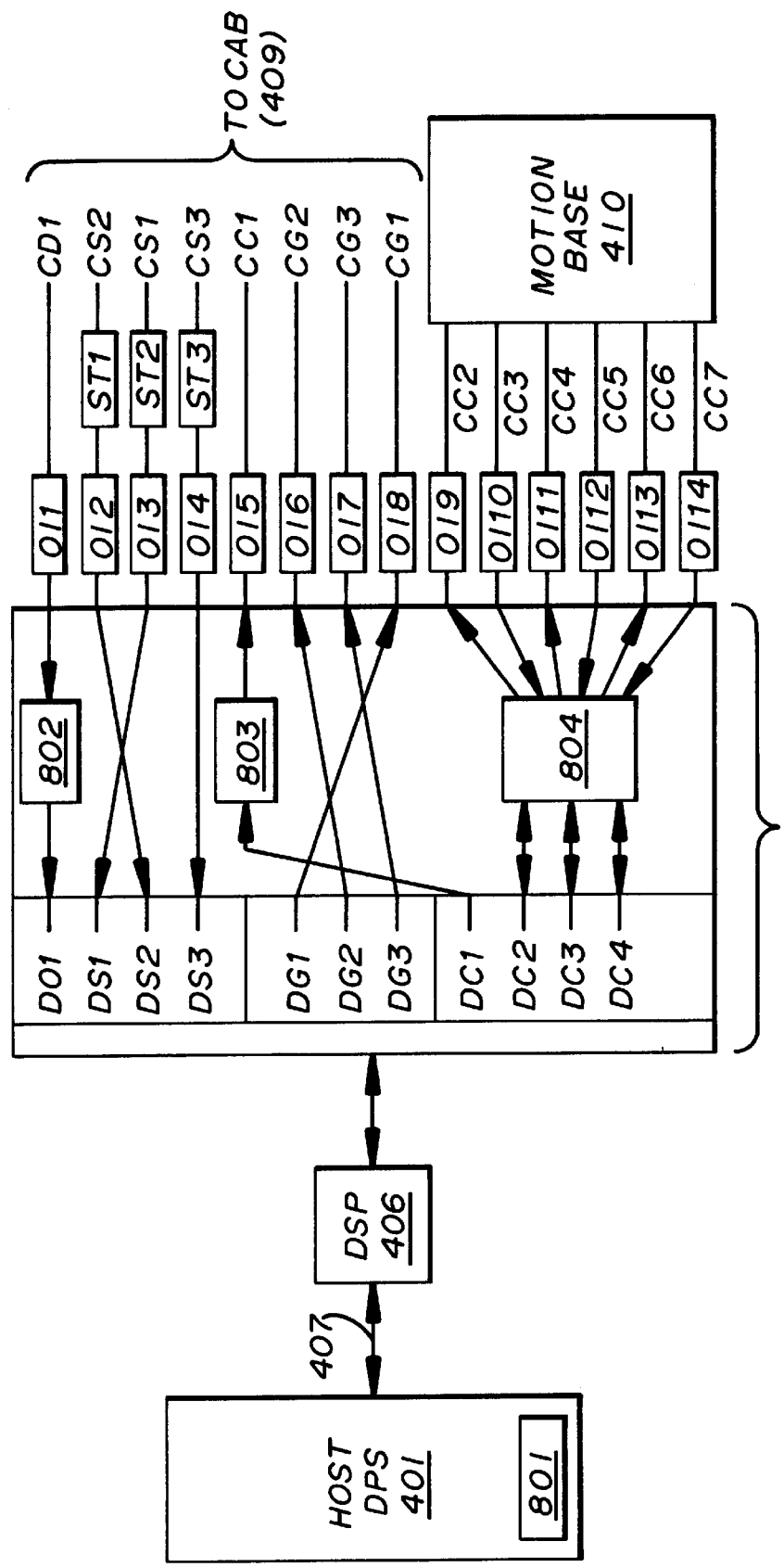
FIG. 8 is a schematic diagram of an FPGA configured in accordance with the present invention, showing basic functions interface functions.

Referring now to FIG. 8, a simplified schematic diagram of the FPGA 408 coupled to a motion base 410, to the cab (not shown) and to a host data processing system 401 via a digital signal processor 406, is shown. The primary purpose of this diagram is to give a basic idea of certain types of functions that may be performed by the FPGA 408. Signal lines on the left side of the FPGA 408 represent inputs to, as well as outputs from the DSP 406; signal lines on the right represent inputs to the cab instrumentation and gauges, inputs to the motion system 410, as well as outputs from the motion system and control outputs from the cab 407. One of the primary tasks that the FPGA 408 performs, as embodied by the present invention, is that of routing signals on one side of the FPGA to their proper location on the other side. For example, signals CS1, CS2 and CS3 represent cab-side signals emanating from switches within the vehicle cab (not shown in this figure), while signals DS1, DS2 and DS3 represent DSP-side signals which respectively correspond to the signals CS1, CS2 and CS3. Signals DG1, DG2 and DG3, on the other hand, are DSP-side FPGA gauge signals which correspond respectively to cab-side gauge inputs CG1, CG2 and CG3. The FPGA 408 is programmed so that signal inputs are routed to their related outputs. If the routing is incorrect, the FPGA 408 may be easily reprogrammed to correct the problem. Signal CD1 is a. cab-side driver input. If signal CDI is coupled to an optical encoder which provides steering wheel position information, decoding of that information may be provided by logic block 802. A hysteretic digital decoder can be constructed from FPGA circuit components. Such a digital decoder can identify the position of a rotating shaft within one of a plurality of equal arcuate spans throughout a full 360' of revolution. The size of the arcuate span may be adjusted to provide more or less sensitivity. Logic block 802 may also be, or may include, a latch constructed from circuitry internal to the FPGA 408 which maintains a cab-specific electrical signal at an input value until that electrical signal is sampled by the host computer system 401 through the DSP 406.

Still referring to FIG. 8, the motion base 410, which utilizes a plurality of optical encoders to sense relative position in each degree of freedom, is coupled to the DSP 406 via the FPGA 408. DSP-side control signals DC2, DC3 and DC4 are coupled to cab-side control signals CC2, CC3, CC4, CC5, CC6 and CC7. The latter signals are coupled directly to the motion system 410. Absolute position of the motion base 410 is determined by calibrating the motion system 410. This is done by moving the motion system within each degree of freedom between travel limits. Logic block 804 includes multiple optical decoders which provide motion system position information to the host DPS 401. Optical decoding circuitry, which may be used in logic blocks 802 and 804 will be described in more detail with reference to FIG. 9. Still referring to FIG. 8, logic block 803 represents signal conditioning circuitry used to condition a signal received from the DSP 406 so that it is compatible with cab requirements. For example, logic block 803 may be a latch constructed from circuitry internal to the FPGA which maintains a cab-specific electrical input at the value received as an output from the DSP 406 until that output is updated by the host computer system 401.

Still referring to FIG. 8, the FPGA is indirectly coupled to both the motion system 410 and the cab circuitry via isolation circuitry. Direct connection is not a particularly good design practice, as direct connection may subject the FPGA 408 to electrostatic discharges, higher-than-expected voltages caused by inductive load kickbacks or miswiring, ground-loop problems, or shorts caused by defective wiring. Subjection of the FPGA 408 to such conditions may compromise the reliability of the FPGA, or may cause it to fail altogether. Although isolation circuitry may include capacitive or inductive coupling, for a preferred embodiment of the invention, a plurality of optical isolators 011–0114 are utilized. Each optical isolator, in its most basic form, consists of a light-emifting diode (LED) adjacent a receiver transistor. Alternatively, an optical isolator may be constructed from a pair of adjacent LEDs, one of which functions as a transmitter, the other of which functions as a receiver. Ground loop and other isolation problems are thereby eliminated. For a preferred embodiment of the invention, the optical isolators 011–0114 are physically located on an easily-configurable interface board. In addition, each switch input from the cab is provided with a schmitt trigger which improves signal reliability by eliminating signal bounce which may occur when a switch is closed. It will be observed that switch signals CS1, CS2 and CS3 are associated with schmitt triggers ST2, STI and ST3, respectively.

Figure 9:
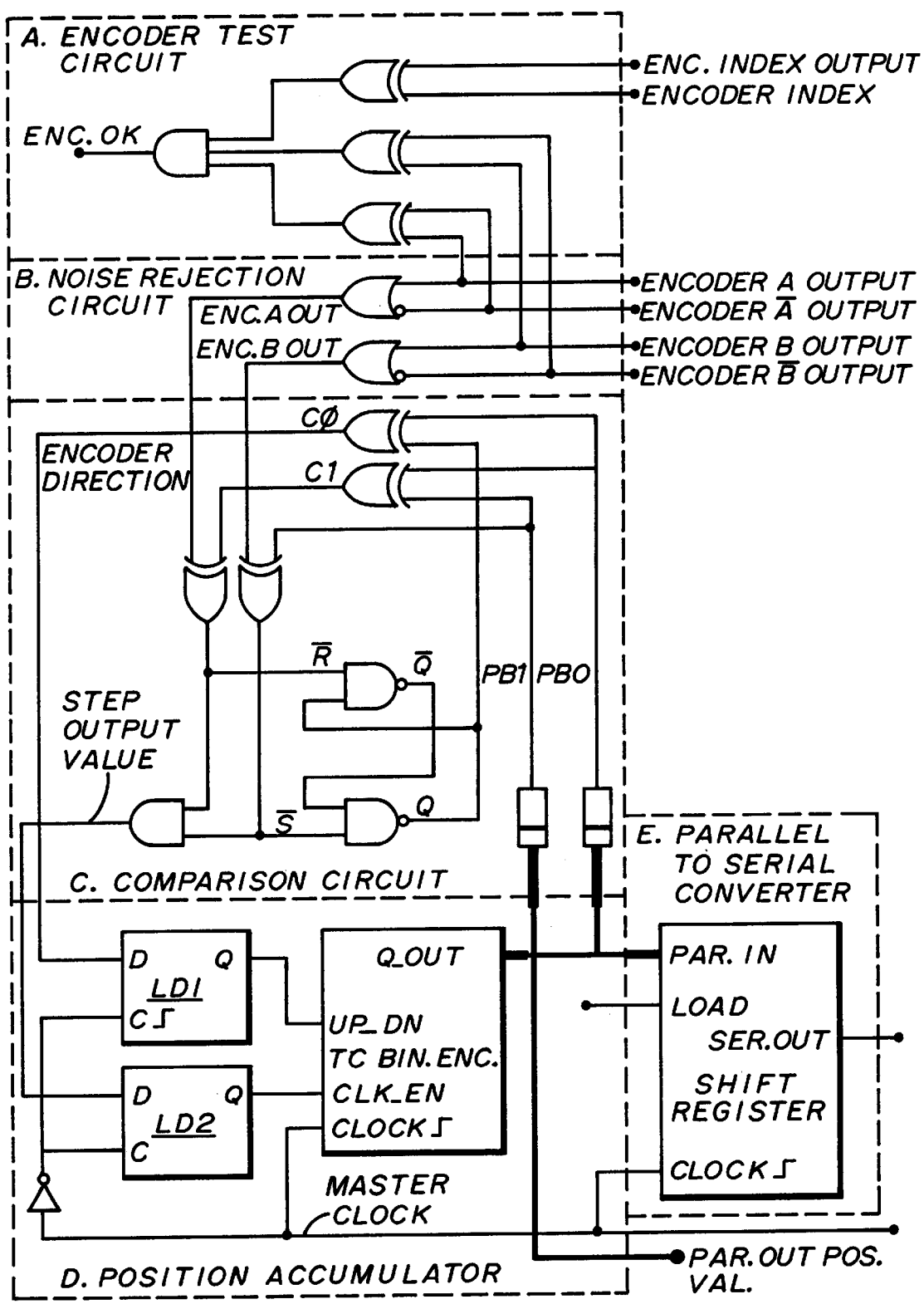
FIG. 9 is a schematic diagram of circuitry used to decode optical encoder inputs.

FIG. 9 shows a currently preferred embodiment of a circuit utilized for decoding the output of a quadrature encoder device. As quadrature encoders are well known in the art, their design and function will not be described herein. These decoding circuits are disclosed primarily to demonstrate the versatility of the FPGA 408 in the context of the present disclosure. Multiple quadrature encoders are employed on the motion base 410 to provide rotational position information. They may also be employed on the steering column of cab 409 to provide directional change inputs. More specifically, FIG. 9 depicts not only the decoding circuit, but three other optional related circuits, as well. The decoding circuit proper may be broken down into two larger blocks: a comparison circuit (block C), and position accumulator (block D). The optional circuits are an encoder integrity test circuit (block A), a noise rejection circuit (block B), and a parallel-to-serial converter (block E).

The optional Encoder Test Circuit monitors the quadrature encoder's outputs and verifies that the encoder outputs are active and that the differential outputs (A,A* and B,B*) are, in fact, opposite states. Should the quadrature encoder lose power, or should a wire be cut or become shorted, the Encoder OK signal will go low and remain low. This safety feature provides the controlling processor, whether it be the host data processing system 401 or the digital signal processor 406, with information relating to the validity of the current position output values from the quadrature encoder.

The optional Nose Rejection Circuit of block B is a common state of the art method of rejecting noise on the wires from the encoder. This circuit is also suggested by the encoder manufacturer.

The optional Parallel-to-Serial Converter of block E simply converts the decoding circuit's parallel output value to a serial value for interface to serial devices.

The Comparison Circuit of block C receives asynchronous data and outputs synchronous data. The asynchronous data is converted to synchronous data having a signed position value in the Position Accumulator Circuit of block D by the master clock signal which is internal to the FPGA 408. Quadrature encoders are rated in counts per revolution, or pulses per revolution. Thus, the encoder specification indicates how many square wave pulses will be generated by the encoder per revolution. These square wave pulses are received by the Comparison Circuit as signals ENC. A OUT and ENC. B OUT. The pulse rate generation is directly proportional to the rotational velocity of the encoder (i.e., revolutions per minute). The decoder circuit is designed with the assumption that the master clock frequency is at least 10 times that of the encoder frequency. As encoder specifications commonly set a maximum operating frequency of about 100 kilohertz, and FPGA's typically operate at a frequencies of at least 1 megahertz. Thus, for real applications, the ratio of master clock frequency to maximum encoder frequency will be at least 10:1. Decoder circuits are generally designed to operate at either one count per encoder pulse (i.e., cycle of the squarewave generator), or four counts per encoder pulse. In order to provide maximum resolution, the circuit of FIG. 9 is designed to operate at four counts per encoder pulse.

Still referring to FIG. 9, the comparison circuit and position accumulator operate by comparing, the received encoder output to the previously received, stored output value. The encoder outputs 4 unique states, which is a 2-bit gray code (a gray code is one in which only a single bit changes at one time). The two least significant stored bits in the position accumulator are converted to the same grey code seen at the encoder outputs. The comparison circuit then attempts to synchronize the position accumulator to the encoder so that the position accumulator value is equal to the encoder value. This is accomplished by detecting an error between the two counts. If an error (i.e., difference) is detected, the position accumulator is incremented or decremented by 1 in the direction of the motion of the encoder. Specifically, the comparison circuit operates by implementing hysteresis in the comparison of the two values. The circuit uses a difference of 1 count between the encoder and the previous output value to determine the encoder's current direction, labeled ENCODER DIRECTION in the drawing. The comparison circuit then waits for another count of difference, for a total error of 2 counts, before signaling the position acumulator to change its count by 1 in the direction of encoder motion. This signal is labeled STEP OUTPUT VALUE. Table 1, below, is the Operational Table for the Comparison Circuit of block C.

TABLE 1

Comparison Circuit Operation Table

| Encoder Value | | Counter Value | | Modifed Bits | |
|---|---|---|---|---|---|
| A | B | D1 | D0 | C1 | C0 |
| 0 | 0 | 0 | 0 | 0 | 0 |
| 0 | 1 | 0 | 1 | 0 | 1 |
| 1 | 1 | 1 | 0 | 1 | 1 |
| 1 | 0 | 1 | 1 | 1 | 0 |

The behavior of the decoder's output value with respect to the encoder's actual position will now be analyzed. As the encoder is rotating at a constant rate, the output value will always be at least 1 count behind the actual encoder position, and as the output value changes, the count will be 2 counts behind the actual encoder position for a period as long as 1 divided by the master clock frequency. As the encoder stops and moves + or −1 count about a specific position, the decoder's output will not change in value, thus the output error will be +1, 0 or −1 count. As the encoder begins to continuously move in either direction, the operation is as stated above.

Although only several embodiments of the present invention have been disclosed herein, it will be obvious to those having ordinary skill in the art that changes and modifications may be made thereto without departing from the scope and spirit of the invention as hereinafter claimed.

What is claimed is:

1. A vehicle driving simulator comprising:
    at least one computer system having at least one input/output port;
    a driving simulation software program executable on said computer system, said software program recognizing a set of standard input signals, at least one of which corresponds to a particular operator-initiated control action, said software program also generating a set of standard output signals, at least one of which corresponds to a particular vehicle operational parameter, said standard input signals receivable by said input/output port, and said standard output signals transmittable from said input/output port;
    a vehicle cab having electrical circuitry which includes a plurality of controls, at least one of which provides a cab-specific electrical signal in response to an operator-initiated control action, and a plurality of instruments, at least one of which requires a cab-specific electrical input for its operation;
    a field-programmable gate array (FPGA) interposed between said input/output port and the electrical circuitry of said vehicle cab, said FPGA converting the cab-specific electrical signals to said set of standard input signals, and also converting said set of standard output signals to said set of cab-specific electrical inputs.

2. The vehicle driving simulator of claim 1, wherein said FPGA includes on-board registers in which may be loaded configuration data unique to said vehicle cab upon initialization of said driving simulation software program by said computer system, said configuration data having a unique set of data values which configure the FPGA so that it will effect the conversion of said set of cab-specific electrical signals and said set of standard output signals to said set of standard input signals and said set of cab-specific electrical inputs, respectively.

3. The vehicle driving simulator of claim 2, wherein said on-board registers retain said configuration data only as long as power is provided to said FPGA.

4. The vehicle driving simulator of claim 2, wherein said computer system comprises a non-volatile memory on which is stored said configuration data.

5. The vehicle driving simulator of claim 1, which further comprises signal conditioning circuitry interposed between said FPGA and said electrical circuitry.

6. The vehicle driving simulator of claim 5, wherein said signal conditioning circuitry comprises isolation means which insulate the FPGA from transient voltages, static discharges, shorts caused by faulty wiring in the cab circuitry and higher than expected voltage levels caused by miswiring of cab circuitry.

7. The vehicle driving simulator of claim 6, wherein said isolation means are selected from the group consisting of optical isolators, transformers and capacitors.

8. The vehicle driving simulator of claim 5, wherein said signal conditioning circuitry includes at least one hysteretic element, which improves signal reliability.

9. The vehicle driving simulator of claim 8, wherein said hysteretic element is a schmitt trigger.

10. The vehicle driving simulator of claim 1, wherein certain cab-specific electrical inputs are latched by internal circuitry of said FPGA until the corresponding standard output signals are updated by said computer system.

11. The vehicle driving simulator of claim 1, wherein certain cab-specific electrical signals are latched by internal circuitry of said FPGA until the corresponding standard input signals are sampled by said computer system.

12. The vehicle driving simulator of claim 1, wherein at least one cab specific electrical signal is converted from an analog to digital format by an analog-to-digital converter prior to its receipt by said computer system.

13. The vehicle driving simulator of claim 1, wherein at least one cab-specific input is converted from digital to analog format prior to its receipt by the cab electrical circuitry.

14. The vehicle driving simulator of claim 1, which further comprises: a display screen positioned in front of said vehicle cab which provides a simulated view of a driving environment to a simulator driver sitting within said vehicle cab; and
a graphics processor coupled to said at least one computer system, said graphics processor producing real-time graphics images which are displayed on said display screen.

15. The vehicle driving simulator of claim 1, which further comprises:
a display screen positioned in front of said vehicle cab in view of a simulator driver sifting within said vehicle cab;
recorded video sequences representative of a simulated view of a driving environment; and a video player for reading said recorded video sequences and presenting them to said computer system for display on said display screen.

16. The vehicle driving simulator of claim 15, which further comprises a motion system coupled to the cab which subjects the driver to forces that are consistent with both images displayed on the screen and driver control inputs.

17. The vehicle driving simulator of claim 15, which further comprises a sound system which produces sounds consistent with projected images and the driver control inputs.

18. A driving simulator comprising:
at least one computer system having at least one input port;
a driving simulation software program executable on said computer system, said software program recognizing a set of standard input signals, at least one of which corresponds to a particular operator-initiated control action, said standard input signals receivable by said port;
a vehicle cab having electrical circuitry which includes a plurality of controls, at least one of which provides a cab-specific electrical signal in response to an operator-initiated control action; and
a field-programmable gate array (FPGA) interposed between said port and the electrical circuitry of said vehicle cab, said FPGA converting the cab-specific electrical signals to said set of standard input signals.

19. The vehicle driving simulator of claim 18, wherein:
said input port also functions as an output port said software program also generates a set of standard output signals, at least one of which corresponds to a particular vehicle operational parameter.
said vehicle cab also has a plurality of instruments, at least one of which requires a cab-specific electrical input for its operation; and
said FPGA also converts said set of standard output signals to said set of cab-specific electrical inputs.

20. The vehicle driving simulator of claim 18, wherein said FPGA includes on-board registers in which may be loaded configuration data unique to said vehicle cab upon initialization of said driving simulation software program by said computer system, said configuration data having a unique set of data values which configure the FPGA so that it will effect the conversion of said cab-specific electrical signals and said output signals to said set of input signals and said set of cab-specific electrical inputs, respectively.

21. The vehicle driving simulator of claim 20, wherein said on-board registers retain said configuration data only as long as power is provided to said FPGA.

22. The vehicle driving simulator of claim 20, wherein said computer system comprises a non-volatile memory on which is stored said configuration data.

23. The vehicle driving simulator of claim 18, which further comprises signal conditioning circuitry interposed between said FPGA and the electrical circuitry of said vehicle cab.

24. The vehicle driving simulator of claim 23, wherein said signal conditioning circuitry comprises isolators which insulate the FPGA from transient voltages, static discharges, shorts caused by faulty wiring in the cab circuitry and higher than expected voltage levels caused by miswiring of cab circuitry.

25. The vehicle driving simulator of claim 24, wherein said isolators are selected from the group consisting of optical isolators, transformers and capacitors.

26. The vehicle driving simulator of claim 23, wherein said signal conditioning circuitry includes at least one hysteretic element, which improves signal reliability.

27. The vehicle driving simulator of claim 26, wherein said hysteretic element is a schmitt trigger.

28. The vehicle driving simulator of claim 18, wherein certain cab-specific electrical inputs are latched by internal circuitry of said FPGA until updated by said computer system.

29. The vehicle driving simulator of claim 18, wherein certain cab-specific electrical signals are latched by internal circuitry of said FPGA until sampled by said computer system.

30. The vehicle driving simulator of claim 18, wherein at least one cab specific electrical signal is converted from an analog to digital format by an analog-to-digital converter prior to its receipt by said computer system.

31. The vehicle driving simulator of claim 18, wherein at least cab-specific input is converted from digital to analog format prior to its receipt by the cab electrical circuitry.

32. The vehicle driving simulator of claim 18, which further comprises:
a display screen positioned in front of said vehicle cab which provides a simulated view of a driving environment to a simulator driver sitting within said vehicle cab; and
a graphics processor coupled to said at least one computer system, said graphics processor producing real-time graphics images which are displayed on said display screen.

33. The vehicle driving simulator of claim 32, which further comprises a motion system coupled to the cab which subjects the driver to forces that are consistent with both the images displayed on the screen and driver control inputs.

34. The vehicle driving simulator of claim 32, which further comprises a sound system which produces sounds consistent with the projected images and the driver control inputs.

35. A driving simulator comprising:
- at least one computer system having at least one output port;
- a driving simulation software program executable on said computer system, said software program generating a set of standard output signals, at least one of which corresponds to a particular vehicle operational parameter, said standard output signals transmittable by said port;
- a vehicle cab having electrical circuitry which includes a plurality of instruments, at least one of which requires a cab-specific electrical input for its operation; and
- a field-programmable gate array (FPGA) interposed between said port and the electrical circuitry of said vehicle cab, said FPGA converting said set of standard output signals to said wet of cab-specific electrical inputs.

36. The vehicle driving simulator of claim 35, wherein:
said output port also functions as an input port
said software program also recognizes a set of standard input signals, at least one of which corresponds to a particular operator-initiated control action, said standard input signals receivable by said port;
said vehicle cab also has a plurality of controls, at least one of which provides a cab-specific electrical signal in response to an operator-initiated control action; and
said FPGA also converts said cab-specific electrical signals to said set of standard input signals.

37. The vehicle driving simulator of claim 35, wherein said FPGA includes on-board registers in which may be loaded configuration data unique to said vehicle cab upon initialization of said driving simulation software program by said computer system, said configuration data having a unique set of data values which configure the FPGA so that it will effect the conversion of said cab-specific electrical signals and said output signals to said set of input signals and said set of cab-specific electrical inputs, respectively.

38. The vehicle driving simulator of claim 37, wherein said on-board registers retain said configuration data only as long as power is provided to said FPGA.

39. The vehicle driving simulator of claim 37, wherein said computer system comprises a non-volatile memory on which is stored said configuration data.

40. The vehicle driving simulator of claim 35, which further comprises signal conditioning circuitry interposed between said FPGA and the electrical circuitry of said vehicle cab.

41. The vehicle driving simulator of claim 40, wherein said isolators are selected from the group consisting of optical isolators, transformers and capacitors.

42. The vehicle driving simulator of claim 40, wherein said signal conditioning circuitry includes at least one hysteretic element, which improves signal reliability.

43. The vehicle driving simulator of claim 42, wherein said hysteretic element is a schmitt trigger.

44. The vehicle driving simulator of claim 35, wherein certain cab-specific electrical inputs are latched by internal circuitry of said FPGA until updated by said computer system.

45. The vehicle driving simulator of claim 35, wherein certain cab-specific electrical signals are latched by internal circuitry of said FPGA until sampled by said computer system.

46. The vehicle driving simulator of claim 35, wherein at least one cab specific electrical signal is converted from an analog to digital format by an analog-to-digital converter prior to its receipt by said computer system.

47. The vehicle driving simulator of claim 35, wherein at least cab-specific input is converted from digital to analog format prior to its receipt by the cab electrical circuitry.

48. The vehicle driving simulator of claim 35, which further comprises:
- a display screen positioned in front of said vehicle cab which provides a simulated view of a driving environment to a simulator driver sitting within said vehicle cab; and
- a graphics processor coupled to said at least one computer system, said graphics processor producing real-time graphics images which are displayed on said display screen.

49. The vehicle driving simulator of claim 48, which further comprises a motion system coupled to the cab which subjects the driver to forces that are consistent with both the images displayed on the screen and driver control inputs.

50. The vehicle driving simulator of claim 48, which further comprises a sound system which produces sounds consistent with the projected images and the driver control inputs.

* * * * *

UNITED STATES PATENT AND TRADEMARK OFFICE
CERTIFICATE OF CORRECTION

PATENT NO.    : 6,270,350 B1  Page 1 of 1
DATED         : August 7, 2001
INVENTOR(S)   : Charles A. Christopher It is certified that error appears in the above-identified patent and that said Letters Patent is hereby corrected as shown below:

<u>Title page,</u>
Please delete [73] Assignee: I-SIM "Corporation", please add [73] Assignee: I-SIM -- LLC --

Signed and Sealed this

Fifth Day of February, 2002

Attest:

JAMES E. ROGAN
*Attesting Officer*   *Director of the United States Patent and Trademark Office*